Figure 1:
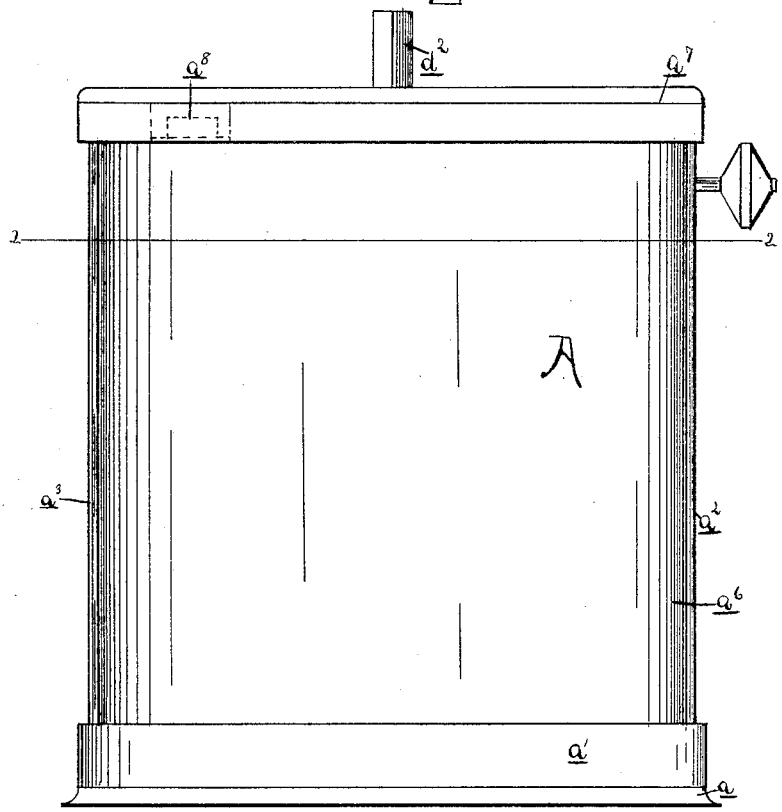

(No Model.)　　　　　　　　　　　　　　　　　4 Sheets—Sheet 1.
G. F. CARD.
ELECTRIC CONTROLLER.

No. 534,060.　　　　　　　　　Patented Feb. 12, 1895.

WITNESSES:
E. K. Hood.
Benjamin Block

INVENTOR
George F. Card,
BY
Geo. B. Furtington,
His ATTORNEY (No Model.)  4 Sheets—Sheet 2.
G. F. CARD.
ELECTRIC CONTROLLER.
No. 534,060. Patented Feb 12, 1895.

WITNESSES:
INVENTOR
George F. Card,
BY
His ATTORNEY.

(No Model.) 4 Sheets—Sheet 3.

G. F. CARD.
ELECTRIC CONTROLLER.

No. 534,060. Patented Feb 12, 1895.

WITNESSES:
E. K. Hood.
Benjamen Bloch

INVENTOR
George F. Card,
BY
Geo. B. Farstinson,
His ATTORNEY.

(No Model.)  4 Sheets—Sheet 4.

G. F. CARD.
ELECTRIC CONTROLLER.

No. 534,060.  Patented Feb 12, 1895.

WITNESSES:
E. K. Hood.
Benjamin Bloch.

INVENTOR
George F. Card,
BY
Geo. B. _____,
his ATTORNEY.

UNITED STATES PATENT OFFICE.

GEORGE F. CARD, OF COVINGTON, KENTUCKY, ASSIGNOR TO THE CARD ELECTRIC COMPANY, OF MANSFIELD, OHIO.

ELECTRIC CONTROLLER.

SPECIFICATION forming part of Letters Patent No. 534,060, dated February 12, 1895.

Application filed May 17, 1894. Serial No. 511,540. (No model.)

*To all whom it may concern:*

Be it known that I, GEORGE F. CARD, a citizen of the United States, residing at Covington, in the county of Kenton and State of Kentucky, have invented a new and useful Improvement in Electric Controllers, of which the following is a specification.

With the advance in the rapid transit system of street railroading, brought about by the introduction of electricity as the motive power, it has been found necessary to provide means for controlling the electric current on the car. The line wire of an electric street car system carries a current of practically uniform intensity, and to vary the amount of current which comes to the motor, various controllers have been used. The controllers now in use have one common feature, that is a sliding contact to control the current.

One type of controller consists of a segment of a circle upon which is mounted a series of contact plates, insulated from each other. These contacts are connected in series by means of resistance coils. Over this segment travels a contact plate, mounted on an arm which swings on a center common to the segment. The terminals are connected to the segments and swinging frame respectively and by moving the contact arm over the insulated plates the current which goes to the motor may be varied to any required degree. Another type of controller consists of a series of plates, insulated from each other, mounted on a drum, and connected to each other by means of resistance coils. Diametrically opposite each other on either side of the drum are two brushes which press against it. The terminals are secured to these brushes and by revolving the cylinder the resistance is varied and thus the motor is governed. Among the objections to these types are, the difficulty with which a damaged piece is replaced and the sparking due to imperfect contact. The parts are so arranged as to be almost inaccessible, and the controller has to be removed from the car in order to repair an injured part. The connections are so inclosed and complicated as to require great care and skill in making and renewing them.

The object of my invention is to overcome these objections and provide a controller in which the slide contacts are supplemented by snap contacts; the parts and connections so constructed and arranged as to be accessible and each part as nearly independent as possible, so that if injured it can be readily replaced, and the connections so arranged that they may be altered or renewed without removing the controller from the car.

My invention consists in the construction, arrangement and combination of parts hereinafter described and claimed.

Figure 2:
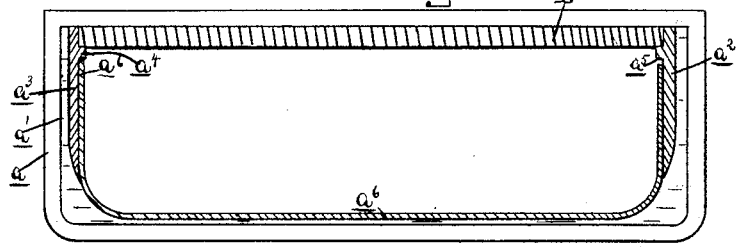
Figure 3:
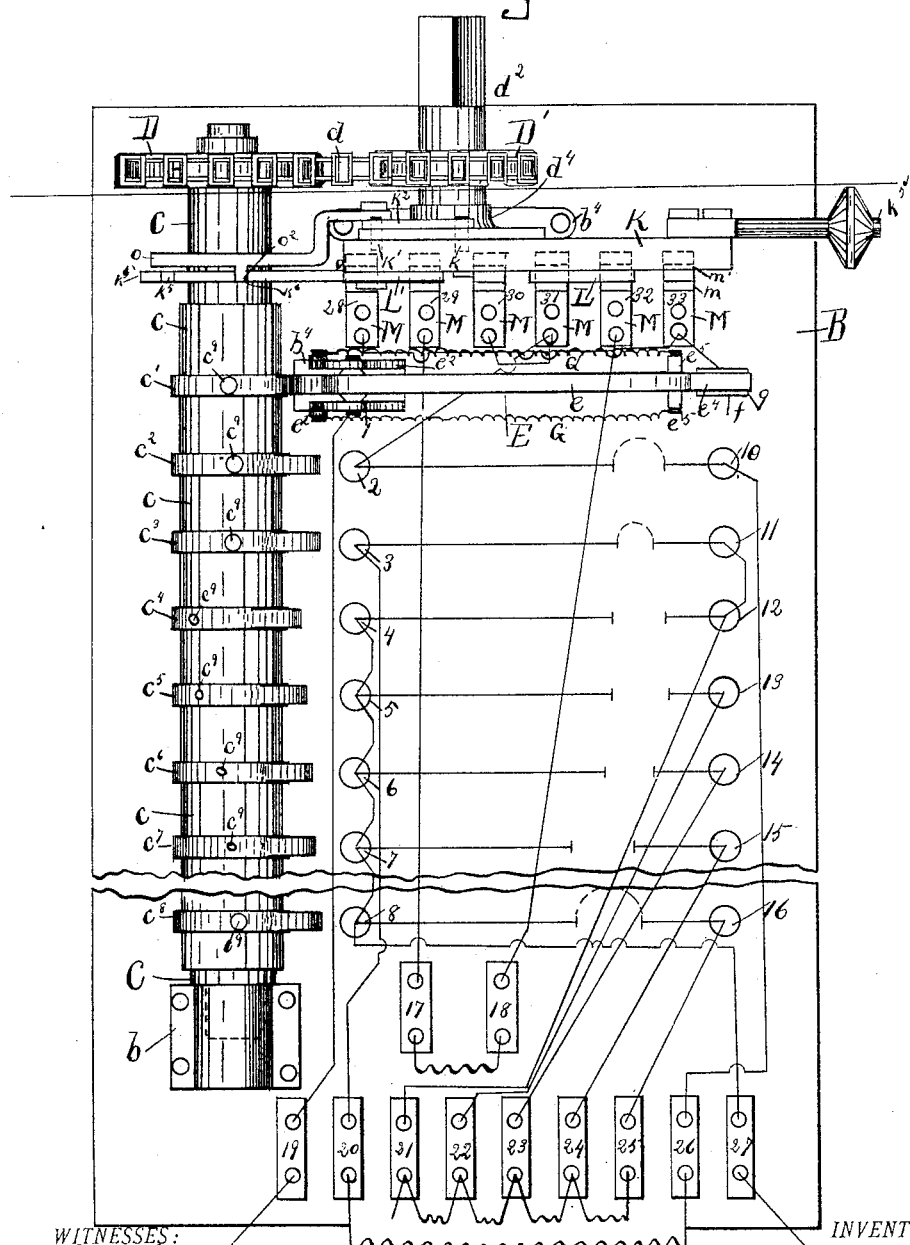
Figure 4:
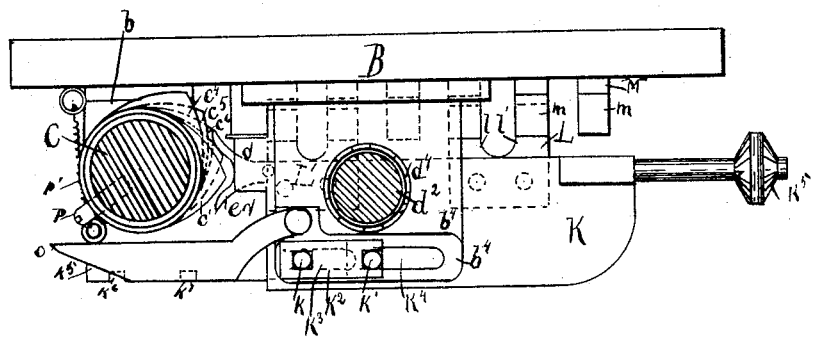
Figure 5:
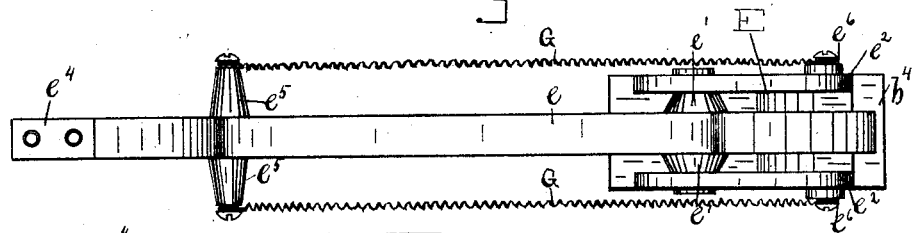
Figure 6:
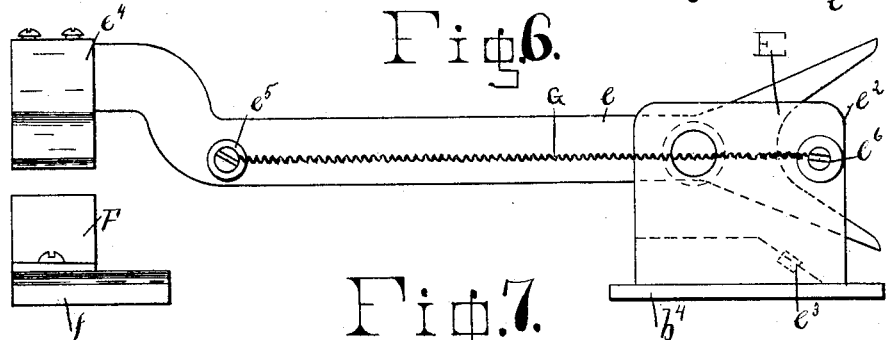
Figure 7:
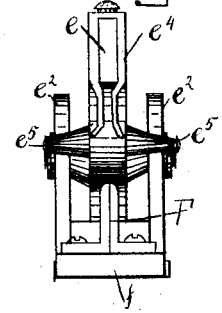
Figure 8:
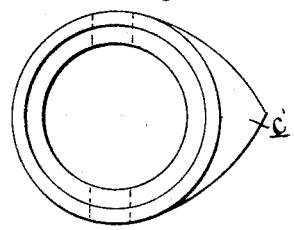
Figure 9:
Figure 10:
Figure 11:
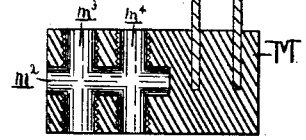
Figure 12:
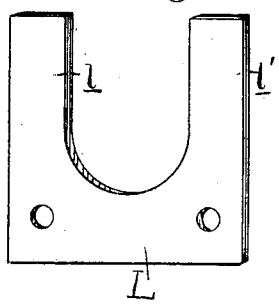
Figure 13:
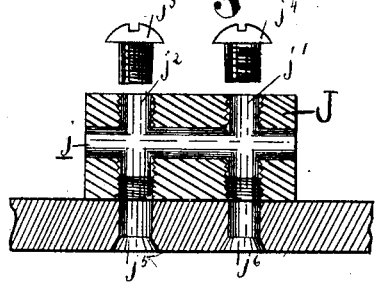

In the drawings, Figure 1, is a front elevation of the controller casing; Fig. 2, a sectional plan on lines 2—2 of Fig. 1; Fig. 3, a conventional elevation of the controller showing the connections; Fig. 4, a sectional plan on lines 4—4 of Fig. 3; Fig. 5, an enlarged plan of the cut-out switch; Fig. 6, an enlarged elevation of the same; Fig. 7, an enlarged end elevation of the same; Fig. 8, an enlarged plan of one of the operating cams; Fig. 9, an enlarged elevation of the same; Fig. 10, an enlarged perspective of one of the securing pins; Fig. 11, an enlarged sectional elevation of one of the reversing contact holders; Fig. 12, an enlarged perspective of one of the receiving contacts; Fig. 13, an enlarged sectional elevation of one of the binding posts used in making the connections.

A is a controller casing formed as follows: A base iron, $a$, is provided with an upwardly extending continuous flange, $a'$. In the receptacle thus formed are placed two side pieces, $a^2$, and $a^3$, having inwardly extending projections, $a^4$, and, $a^5$, which form stops for a back, B, upon which is mounted the controlling mechanism. A sheet metal front, $a^6$, bent in the form shown, is placed between these sides and over the whole a cap iron, $a^7$, is placed. The base iron and cap hold the sides and front together without the use of screws or bolts, and permit easy access for examination and repair.

C, is a shaft mounted in a bearing, $a^8$, depending from the cap iron and a bearing, $b$, fastened to the back, B. This shaft may be driven by any suitable means. In the form shown a sprocket wheel, D, is mounted on the shaft. Passing around this wheel is a sprocket chain, $d$, which in turn passes around another sprocket wheel, D', mounted on an arbor, $d^2$ which has a bearing, $d^4$, in the bracket, $b^4$, secured to the back, B. The upper end of this arbor is squared in order to receive a lever by which it may be operated. By revolving the arbor the movement is transmitted to the shaft, C. This shaft is covered with a non-conducting material, $c$, preferably hard rubber or well seasoned and oiled hard maple. Over this covering a series of cams, $c'$ $c^2$, &c., secured to the shaft by means of pins, $c^9$, of non-conducting material is placed. These cams are adapted to actuate a series of cut-outs, E, each cam having its corresponding cut-out and the cams so arranged that part of them engage their cut-outs concurrently, while the remaining ones engage their cut-outs successively. These cut-outs consist of a forked arm, $e$, mounted in the bracket, $b^4$. This bracket carries two vertical standards, $e^2$, which form the bearings for the forked arm which is provided with hubs, $e'$ located near the point where the arm forks. The arm is mounted in the bracket by passing a shaft through these hubs and the standards, $e^2$. A stop, $e^3$, preferably flexible to prevent noise when the arm, $e$, is thrown down against it, is placed in the base of the bracket. The forward end of the arm, $e$ is provided with a yoke, $e^4$ bent in the form shown to form a spring grasp which engages a contact plate, F, mounted on a base, $f$. This contact is formed by bending a piece of metal in a double L-shape with the vertical arms together. The arm, $e$, is provided with lugs, $e^5$, provided at their outer extremity with binding screws. Mounted on the standards, $e^2$ back of the pivotal point of the swinging arm, $e$, are two extensions, $e^6$. A spring or springs, G, are stretched between the lugs, $e^5$, and extensions, $e^6$. The location of the lugs relatively to the pivotal point of the arm is such that, when the arm is in the position shown in Fig. 5, that is, in a position in which the contacts are slightly separated, the pivot, the lugs, $e^5$, and extensions, $e^6$, are in the same plane and the springs are under their greatest tension. It is obvious that, when the movement of the arm, in its swing, carries the springs beyond this position of greatest tension they act to propel the arm still farther. These cut-outs are so placed that the forked portion of the arm will partly embrace the corresponding cam, thus being in a position to be engaged and operated thereby. The brackets, $b^4$ are fastened to the back board, B, of the controller at the points, 1 to 8, inclusive. The contact carriers, $f$, are fastened at the points, 9 to 16, inclusive, opposite the cams and in line with the brackets. The two parts of the cut-out, namely: the bracket, $b^4$, and the contact carrier, $f$, are insulated from each other by the back B, which is of a non-conduction material. By revolving the shaft, C, the cams are brought into engagement with the forked arms and the forward end is raised or lowered, as the case may be, enough to throw the springs out of line with the pivoting point and the contacts are at once engaged or disengaged, by means of the springs. Above this series of contacts is mounted reversing mechanism by which the current in the armature is reversed. The form shown consists of a plate, K, of a non-conducting material, provided with bolts, $k$, $k'$, adapted to take through slots, $k^3$, $k^4$, in the bracket, $b^4$. A plate, $k^2$, is fastened to these bolts, on the opposite side of the bracket, $b^4$, from the plate, K to form a support therefor but allow longitudinal movement of the same. Mounted on the plate, K, are contact plates, L, L', preferably provided with arms, $l$, $l'$, adapted to engage with the contact plates, $m$, $m'$ mounted in a binding block, M, having a longitudinal channel, $m^2$, and threaded channels, $m^3$, $m^4$ perpendicular thereto, adapted to receive screws at the top by which a wire placed in $m^2$, may be clamped, and screws at the bottom to secure the block to a suitable support. Six of these blocks, M, are arranged side by side as shown in Fig. 3, two of which are connected by the plate, L' one left unconnected, two more connected by the plate, L, and the sixth left unconnected.

The means for making the different electric connections may be of any desired form but I have shown a preferred one, consisting of a block, J, with a longitudinal channel, $j$, extending through it and two threaded channels, $j^2$, $j^3$, at right angles thereto adapted to receive clamping screws, $j^5$, $j^6$, at the bottom.

The arrangements of the connections are as follows: Two binding blocks, J, are placed at, 17 and 18 to which the armature connections are fastened. A row of binding blocks is fastened at 19 to 27 inclusive, 19 and 27 being connected to the terminals, 20 and 26, are connected to the field coils, and 21 to 25 inclusive are connected by resistance coils. A row of binding blocks, M, is placed at the points, 28 to 33 inclusive. The current enters at 27, passes to 8, across to 16 down to 25, through all the resistance to 21, thence to 12, thence to 11, across the switch to 3, down to 20, through the field to 26, thence to 10, across the switch to 2, up to 31, across the contact plate, L, to 32, down to 18, through the armature to 17, thence to 29, across the contact plate, L', to 28, thence across to 33, down to 9, across the switch to 1, down to 19 and out to the other terminal. The arrangement of the cams on the shaft C, is such that, $c'$, $c^2$, $c^3$, $c^8$ engage their cut outs concurrently, so that these are all closed at one time. The remaining cutouts are operated successively beginning with $c^7$. By a further revolution of the shaft in the same direction as when the former cut-outs were thrown into engagement, $c^7$ is thrown into engagement and the current instead of crossing from 8 to 16, goes from 8 to 7, across the switch to 15, thence to 24, to 21 and thence through the same path heretofore described. The resistance between 24 and 25 is thus cut out, and by further rotation of the shaft the resistance may be cut out in succession until the current goes direct to the motor. To throw resistance in the reverse movement is given to the shaft, C.

To reverse the current in the armature the plate, K is drawn outward by means of the lever, $k^5$, thereby causing the contact plate, L, to connect 32 and 33, and the contact plate L' to connect 29 and 30. The current then comes from 2, to 31, thence across the wire connection to 30, through the contact plate, L', to 29, down to 17, and through the armature to 18, up to 32, across the contact plate, L, to 33 and out as before.

In order to prevent the reversing of the current without first cutting the motor out of the circuit, I provide locking mechanism consisting of a bar, $k^5$, rigidly secured to the sliding plate, K, provided with notches, $k^6$, and $k^7$, and a latch, o, pivotally mounted to the bracket, $b^4$, provided with a lug, $o^2$, adapted to engage with the notches $k^6$, $k^7$, one when the current is in one direction and the other when in the reverse. For operating this latch and disengaging it from the bar, I provide a lug, P, extending from the shaft, C, at such a point relatively to the position of the cams as to engage the latch when the current is off, lift the lug out of engagement with the bar, $k^5$, and allow longitudinal movement of the plate, K. As soon as the current is turned on the latch is drawn into engagement with the bar, $k^5$ by means of a spring, $p'$.

The controller is fastened to the dash-board of the car when in position for operation.

The cap plate, $a^7$, may be provided with a series of graduations adapted to register with the cut-outs, the purpose being to enable the operator to know how much current he is using.

I claim as my invention—

1. The combination in an electric controller, of a series of contacts; a series of pivoted arms carrying contacts adapted to engage with the contacts of the other series; means for holding the contacts in or out of engagement; mechanism for imparting an initial movement to the pivoted arms, and means for automatically completing the movement, substantially as and for the purpose set forth.

2. The combination in an electric controller, of a series of contacts; a series of pivoted arms carrying contacts adapted to engage with the contacts of the other series; a shaft; a series of cams, carried thereby, adapted to engage with the pivoted arms and impart an initial movement thereto; and springs adapted to complete the movement in either direction, substantially as and for the purpose set forth.

3. The combination in an electric controller, of a series of contacts; a series of pivoted arms carrying contacts adapted to engage with the contacts of the other series; a shaft; a series of cams, carried thereby, adapted to engage with the pivoted arms and impart an initial movement thereto; and springs adapted to complete the movement in either direction and hold the contacts in or out of engagement, substantially as and for the purpose set forth.

4. In an electric controller, a shaft; a non-conducting sleeve embracing the shaft; a series of cams mounted on the sleeve; cut-out mechanism adapted to be actuated by the cams, and means for rotating the shaft, substantially as and for the purpose set forth.

5. The combination in an electric controller of a series of contacts; a series of pivoted arms carrying contacts adapted to engage with the contacts of the other series; a shaft; a non-conducting sleeve embracing the shaft; a series of cams mounted on the sleeve adapted to engage with the pivoted arms and impart an initial movement thereto; springs adapted to complete the movement in either direction and hold the contacts in or out of engagement, substantially as and for the purpose set forth.

6. The combination in an electric controller of a series of contacts; a series of pivoted and forked arms carrying contacts adapted to engage with the contacts of the other series; a shaft; a non-conducting sleeve embracing the shaft; a series of cams mounted on the sleeve adapted to engage with the forked arms and impart an initial movement thereto, and springs adapted to complete the movement in either direction, substantially as and for the purpose set forth.

7. The combination in an electric controller of a series of contacts; a series of pivoted and forked arms carrying contacts adapted to engage with the contacts of the other series; a shaft; a non-conducting sleeve embracing the shaft; a series of cams mounted on the sleeve adapted to engage with the forked arms and impart an initial movement thereto, and springs adapted to complete the movement in either direction and hold the contacts in or out of engagement, substantially as and for the purpose set forth.

8. In an electric controller a reversing switch; a notched bar adapted to move therewith; a latch adapted to engage the notched bar; a shaft; and a lug on the shaft adapted to actuate the latch, substantially as and for the purpose set forth.

9. In an electric controller a reversing switch; a notched bar adapted to move therewith; a latch adapted to engage the notched bar; a cut-out; a shaft; cams on the shaft adapted to actuate the cut-out, and a lug on the shaft located to engage and release the latch when the current is shut off, substantially as and for the purpose set forth.

10. The combination in an electric controller of a shaft; a series of cams carried thereby; cut out mechanism adapted to be actuated by the cams; a reversing switch; a notched bar adapted to move therewith; a latch adapted to engage with the notched bar, and a lug on the shaft adapted to engage with the latch after the current is shut off, substantially as and for the purpose set forth.

11. The combination of an electric controller with a casing consisting of a base provided with an upwardly extending flange; side pieces placed within the flange; a back carrying the controlling mechanism placed within the flange and between the sides; a front consisting of a U-shaped piece placed within the flange and between the sides; and a cap provided with a downwardly extending flange adapted to embrace the upper ends of the sides, back and front and lock them in position, substantially as and for the purpose specified.

GEORGE F. CARD.

Witnesses:
JAMES N. RAMSEY,
ERNEST K. HOOD.